Figure 4:
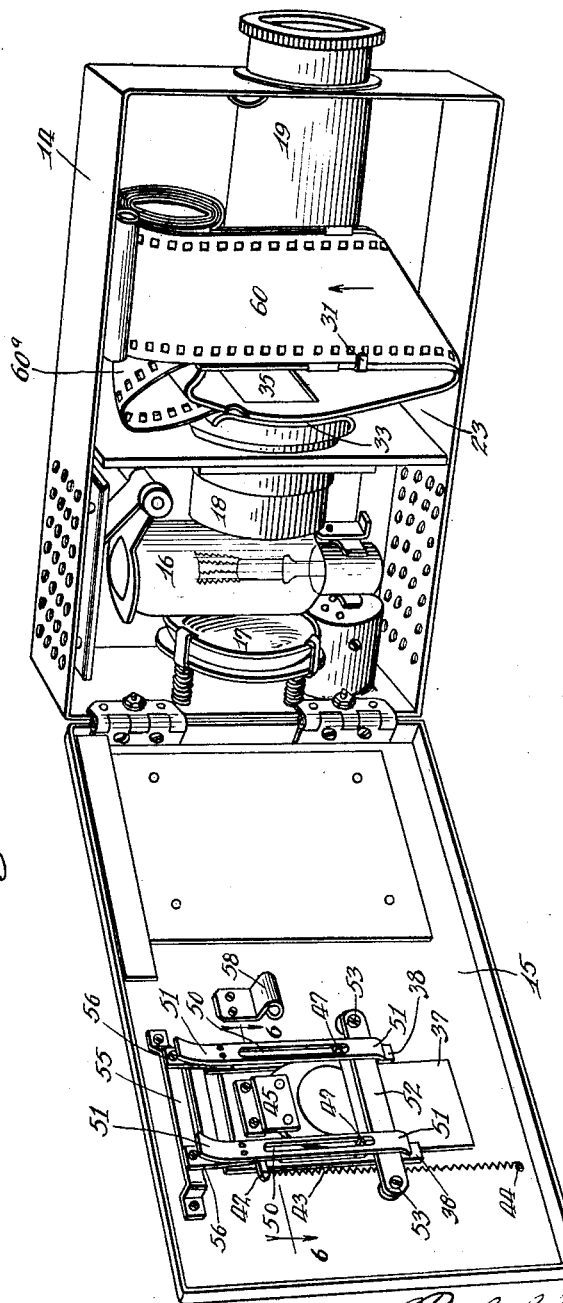

July 14, 1931. R. P. DE VAULT 1,814,588
PICTURE PROJECTOR
Filed May 14, 1927 3 Sheets-Sheet 1

Witness:
Dave S Magnusson

Inventor
Ralph P. DeVault
By Luther Johns
Atty.

July 14, 1931.    R. P. DE VAULT    1,814,588
PICTURE PROJECTOR
Filed May 14, 1927    3 Sheets-Sheet 2
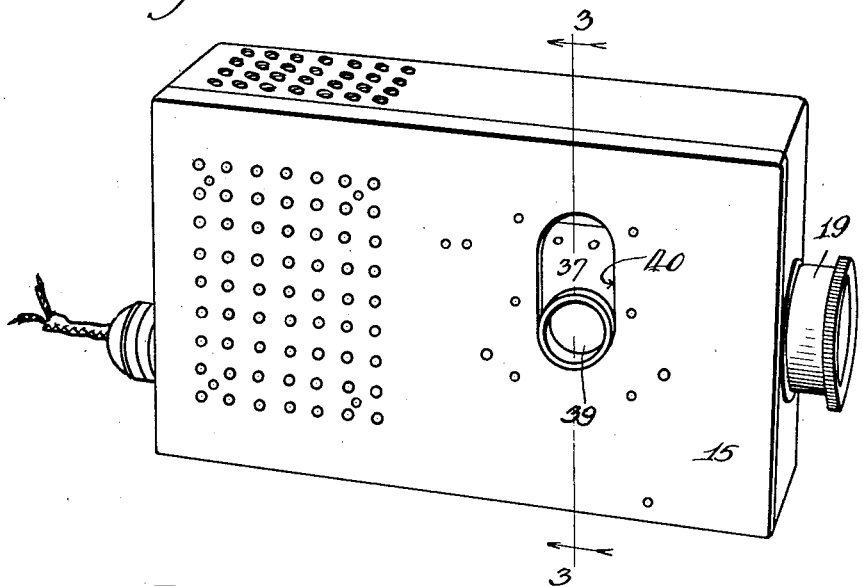
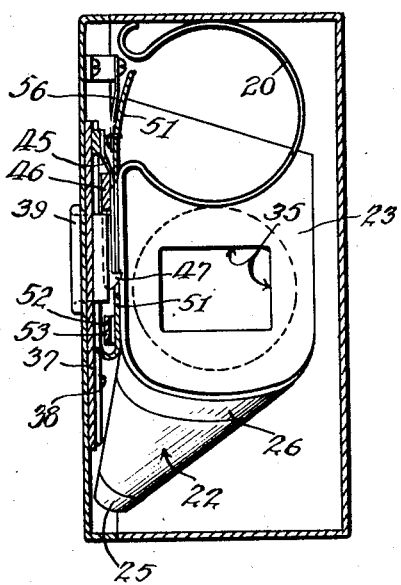
Witness
Dave S. Magnusson
Inventor
Ralph P. DeVault
By Luther Johns

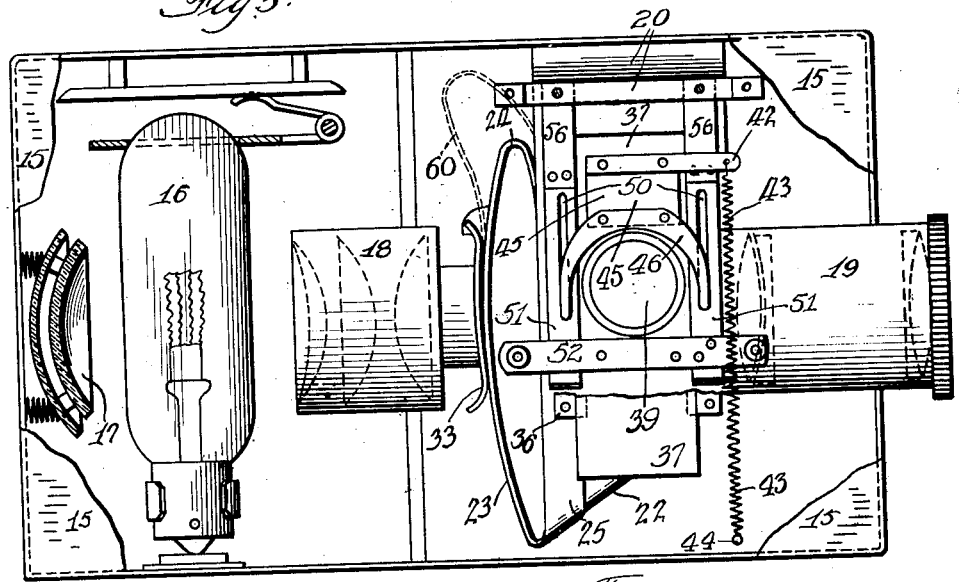
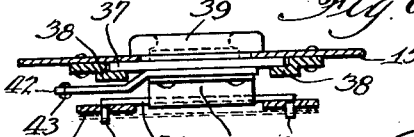
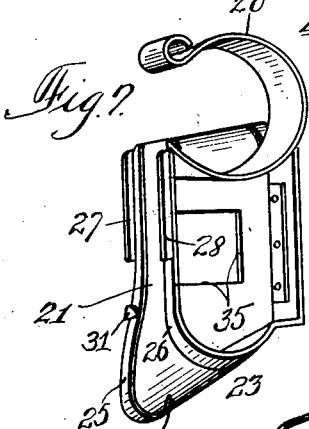
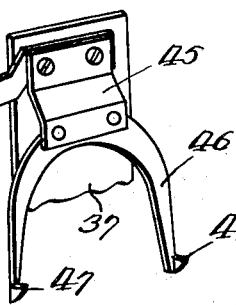

Patented July 14, 1931

1,814,588

UNITED STATES PATENT OFFICE

RALPH P. DE VAULT, OF VILLA PARK, ILLINOIS, ASSIGNOR TO SOCIETY FOR VISUAL EDUCATION, INC., OF CHICAGO, ILLINOIS, A CORPORATION OF ILLINOIS

PICTURE PROJECTOR

Application filed May 14, 1927. Serial No. 191,313.

The chief object of this invention is to provide a small, compact and efficient projector employing film for "still" pictures. A more specific object is to provide a small projector having notably simple and advantageous means for holding an endless film for movement, and for moving the film, past the projection aperture, while avoiding the use of film spools or reels. Other objects are to provide film-holding means peculiarly easy for the ordinary person to thread and operate; to provide a projector as a whole which, through the advantageous arrangement and construction of the film-holding parts, may be exceedingly compact; and also to accomplish such advantages in a device accommodating films of the standard width such as are employed in large machines.

A general object is to provide a device of the character described having relatively few parts, one which is strong, durable, efficient and reliable, simple in construction, easy of operation, which may occupy small space, and which is not likely to get out of order.

In the accompanying drawings forming a part of this specification, Figure 1 is a perspective of the device complete with the door open; Fig. 2 is a similar view showing the door closed; Fig. 3 is a sectional view at about the line 3—3 of Fig. 2; Fig. 4 is a perspective of the film holding and guiding means and the film gate; Fig. 5 is a view of the parts from directly in front of the door side with the lid for the most part broken away. It shows among other features the film moving mechanism on the lid from the opposite side of that shown in Fig. 1; Fig. 6 is a vertical section through the film moving mechanism as on the line 6—6 of Fig. 1; Fig. 7 is another perspective of the device shown in Fig. 4; Fig. 8 is an enlarged detail of the claw member for moving the film, and Fig. 9 is a view of the endless film with the loop formed therein somewhat after the manner of the way it appears when on the film guide.

Such features of the device as a whole as the housing or case 14 having one side serving as a hinged door 15, the concentration filament lamp 16, the reflector 17, the condensing lens unit 18, and the adjustable projection barrel 19 containing lenses are old severally and in combination with each other and with various kinds of film shifting means.

The present invention resides in features connected with the holding and shifting of the film and in the combination of these features with themselves and with other parts.

Turning to Figs. 4 and 7, the film holding and guiding means may be formed, as shown, chiefly from a single piece of strip metal. Beginning at the top there is a substantially cylindrical turn in the metal forming an open ended pocket 20. The strip thence continues downward to form the part 21 which has straight-across lines substantially parallel with the axis of the cylindrically-shaped film pocket 20. The strip at 22 is given what I would describe a flaring twist, both the flare and the twist being clear from Fig. 3. In other words, this flaring and twisted part 22 is substantially wide along one edge of the strip and substantially narrow at the other. The strip then continues to form the upwardly-extending bowed part 23, which has straight-across lines transverse of the axis of the pocket 20 and therefore transverse of the axis of the roll of film therein, and this part 23 has its straight-across lines substantially at right angles with the straight-across lines of the part 21. This effect is had through the flaring twist at 22. The part 23 turns inward at 24 and is secured as by brazing to other metal parts there.

Metal strips 25 and 26 are secured upon the edge portions of the main strip described and form marginal rest surfaces so that the pictures on the film will not be abraded by its sliding movement on the guide member. Fig. 7 shows up-standing cleats 27 and 28 which may be turned up from the strips 26 and 25 respectively and constitute edge guides for maintaining the film in its desired alignment with the roll at that place. The slots 29 and 30 are for receiving the claw points of the film shifting device when projecting through the small marginal apertures in the film.

The overhanging lip 31, Fig. 4, serves to maintain the film from buckling outward at that place when the door is open.

The gate 33, Fig. 4, is carried by a pair of springs 33a mounted on the guide member 23 and may be swung back under spring tension for insertion of the film. It has a projection aperture 34 in line with the projection aperture 35, Fig. 3, in the member 23.

Turning now to Figs. 1, 6 and 8, the means for moving the film are mounted on the door 15. There is first a vertically sliding plate 37 mounted in lateral guides 38 secured to the door 15. A finger button 39 is secured to this plate 37 and projects through a normally vertical slot 40 in the door, Fig. 2. Fig. 8 shows that on the slide 37 there is secured an arm 42 to which is connected a coiled tension spring 43 secured at 44, Fig. 1, to the door and holding the plate 37 normally at its downward limit of movement. The plate 37 carries a light spring metal connecting piece 45 to which is secured a claw member 46 in the form of a yoke provided with claw points 47 adapted to engage the lateral notches in the film. The leaf spring 45 maintains the claw yieldably in its engagement with the film. The claw points are so formed that they will pull upon the film in the upward movement and slip out of the film holes when the points are moved by the spring 43 in the downward direction.

Fig. 1 shows that these claw points 47 travel in slots 50 in light, springy lateral strips 51 which are carried floatingly at their lower ends by a springy cross-bar 52 held in spaced relation at 53 to the lid 15. The bracket 55, Fig. 1, carries a pair of light spring members 56 which support the upper free ends respectively of the vertically disposed members 51 (see Fig. 3). The marginal portions of the film travel against these members 51, which are curved inward at the top to guide the film upon the outer turn of the roll.

When the operator desires to move the film a step he moves the button 39 (Fig. 2) upward, which movement is limited to the amount required to bring the next picture on the strip before the projection aperture 35 (Fig. 1).

The upwardly extending projection 58 (Fig. 1) secured to the door extends transversely across the edge of the film when the door is closed and maintains it from moving laterally in the direction of the door.

Fig. 1 shows the film 60 having the greater part thereof in the form of a roll within the pocket. Fig. 9 is designed to show that the film issues laterally from the inner turns. Turning again to Fig. 1 we note that a bulge 60a first occurs, and that then the film passes behind the gate 33 which holds it in contact with the bowed part 23. The part 23 is bowed as illustrated for a distinct purpose. When the rays of light strike a film the heat engendered tends to cause it to buckle, with consequent distortion to the projected picture. I have found that where the surface is slightly curved as illustrated such curvature does not affect the projection results, at least to any material extent, while it does prevent the film from buckling, since it is much more difficult to buckle a curved plate than a flat plate, since such a curved plate resists buckling.

The film makes a twist at the bottom of the device, as at 22 Fig. 4, following the contour of the guide means there and then passes upward as a substantially flat sheet over the part 21, Fig. 4, being so held in part by the strips 51, Fig. 1. The film is forced directly upon the outer turn of the roll by the claw points 47. At the same time then a push occurs when the outer turn of the roll which is communicated to the roll as a whole, partly releasing and partly forcing inner turns laterally, while at the same time a pull upon the inner turns is effected, being communicated to them through the twisted part 60a, Fig. 1. In practice the operator simply lifts upward upon the button 39, Fig. 2, moving the film a step, and then on releasing the button the claw is drawn downward, engaging the film at another place for the next upward movement.

Through this arrangement of the means for guiding and shifting the film the device as a whole may be very compact indeed, and in my practice is so small that it may readily be slipped into the pocket of a man's coat. Since it may employ standard-size film it is possible to use this small device to project substantially large pictures upon the wall of a room or a canvas arranged for the purpose, or to project smaller pictures directly upon a sheet of paper held in the hands. The device has many uses, both for pleasure and business.

I contemplate as being included in these improvements all such variations, departures and modifications from what is thus specifically illustrated and described as fall within the scope of the appended claims.

I claim:

1. In a picture projector, the combination of walls forming a housing including a door for gaining access to the interior of the housing, means providing a projection aperture within the housing, means within the housing for holding a flexible film for travel past the projection aperture, and means mounted on the door of the housing adapted to engage the film when the door is closed for moving the film step by step, and means for operating said film-engaging means.

2. In a projector, the combination of walls forming a housing including a door for gaining access to the interior of the housing, means providing a projection aperture within the housing, means within the housing for holding a flexible film for travel past the projection aperture, and means mounted on the door of the housing adapted to engage the film when the door is closed for moving the film step by step and means for operating said film-engaging means manually from without the housing.

3. The combination with the optical system of a picture projector, of a housing enclosing said system, the housing including a door for gaining access to the interior, means for holding a film for movement in the optical axis with a portion of the film facing and closely adjacent to the door when the door is closed, means carried by the door for engaging the film to move it when the door is closed, and means for operating said film-moving means.

4. In a projector, the combination with the optical system of a housing enclosing same, the housing including a door for gaining access to the interior, means for holding a film for movement in the optical axis with a portion of the film facing and closely adjacent to the door when the door is closed, means carried by the door for engaging the film to move it when the door is closed, and means carried by the door for operating said film-moving means manually from without the housing.

5. In a projector, the combination with the optical system of a housing enclosing same, the housing including a door for gaining access to the interior, means for holding a film for movement in the optical axis with a portion of the film facing and closely adjacent to said door when the door is closed, means including a reciprocating claw device carried by the door for engaging the film at marginal apertures thereof to move it when the door is closed, and means projecting through the door for manually reciprocating said claw device.

6. In a projector of the character described, the combination with the optical system of walls forming a housing, including a door for gaining access to the interior thereof, means providing a projection aperture within the housing, means within the housing for holding an endless band of flexible film in the form of a coil and a small loop of film extending therefrom for travel past the projection aperture, means mounted on the door of the housing adapted to engage the film when the door is closed for moving the film step by step, and means for operating said film-moving means from without the housing to move the film.

7. The combination with the optical system of a picture projector, of a substantially cylindrical shell-like device open at one end for holding loosely a small coil of endless film in a roll with its axis substantially parallel with the axis of projection, means for guiding a small loop of film issuing from the inner turn of the roll and received back upon the outer turn of the roll whereby one portion of such loop will travel in the optical axis and another portion will travel at one side of the optical axis, and means for moving the film in its path of travel.

8. In a picture projector, housing means for holding loosely therein a coil of endless picture film in a roll having a substantially horizontal axis and with a substantially small loop thereof extending from its inner turn to its outer turn, with means for guiding said loop of film in two substantially oppositely-directed paths of travel, one from and the other toward said coil-holding means, with a bend of substantially one hundred eighty degrees and a twist of substantially ninety degrees in the small loop whereby portions of said paths are substantially at right angles to each other, with means forming a projection aperture in one of said paths, said coil-holding means being above said aperture, and means including said guide means for moving the film with a step by step movement past said projection aperture and for simultaneously causing the roll of film to turn bodily within the housing means for unwinding therefrom and for winding thereon film forming said loop.

9. In a picture projector, means providing a projection aperture, means including a gate for guiding the film at said aperture substantially at right angles to the axis of projection passing through said aperture, means closely adjacent to and beyond said aperture in the direction of film travel for guiding the film to provide a bend therein of substantially one hundred eighty degrees and also a twist of substantially ninety degrees whereby the film moves in reverse direction with a portion of the film substantially at right angles to its position at said aperture, housing means above and closely adjacent to said aperture for holding a roll of endless film loosely for free bodily turning movement whereby the film may be paid out from its inner turn and paid back upon its outer turn while forming a substantially small loop of film extending from such roll, the axis of said loop being substantially parallel with the axis of projection, and means for moving the film with a step by step movement past said projection aperture and for simultaneously causing the roll of film to turn bodily within the housing means for unwinding therefrom and for winding thereon film forming said loop, said guiding means operating to hold the loop of film in its path whereby portions of the film are pushed back to the roll.

10. In a picture projector, film-holding means comprising a member having a projection aperture therein and being adapted to guide the film substantially at right angles to the axis of projection at said aperture, means adjacent to and beyond said aperture in the course of film travel for guiding the film to provide a bend therein of substantially one hundred eighty degrees and also a twist of substantially ninety degrees whereby the film moves in a substantially reverse direction forming a loop of film and with a portion of the film substantially at right angles to its path of movement at said aperture, and means forming a film roll pocket open at one end to pay out film from the inner turn of the roll therein and open at its side to receive film on the outer turn thereof, and adapted to hold the roll loosely therein, the open end of said pocket being directed toward the plane of said aperture, and means including said guide means beyond the aperture for moving the film with a step by step movement past said projection aperture and for causing the roll of film to turn bodily in said pocket for unwinding therefrom and for winding thereon film forming said loop.

11. In a picture projector, film-holding means in the form of a unitary structure comprising walls forming a film-holding pocket open at one side to receive film upon a roll of film within the pocket and open at one end to pay out film from such roll, and a guide member having a film-guiding surface in the form of a twisted loop with portions thereof substantially at right angles to each other extending from said pocket-forming means, said surfaces being defined by marginal guides adapted to contact the film at marginal edges thereof, said twisted loop structure defining the path of a loop of film extending from such roll and having a projection aperture therethrough, and means for moving the film with a step by step movement past said projection aperture and for simultaneously causing the film to be fed upon the outside of such roll and to be withdrawn from the inside thereof while the roll turns loosely in said pocket.

RALPH P. DE VAULT.